(12) United States Patent
Majee

(10) Patent No.: US 8,806,056 B1
(45) Date of Patent: Aug. 12, 2014

(54) METHOD FOR OPTIMIZING REMOTE FILE SAVES IN A FAILSAFE WAY

(75) Inventor: Sumandra Majee, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 767 days.

(21) Appl. No.: 12/623,139

(22) Filed: Nov. 20, 2009

(51) Int. Cl.
*G06F 15/16* (2006.01)

(52) U.S. Cl.
USPC .......................................... 709/237; 709/234

(58) Field of Classification Search
CPC ..... H04L 67/06; H04L 67/2833; H04L 47/32; H04L 47/323; H04L 11/0709; H04L 11/0727; H04L 11/0766
USPC .......................................... 709/230, 234–237
See application file for complete search history.

(56) References Cited

U.S. PATENT DOCUMENTS

| | | | |
|---|---|---|---|
| 5,282,201 A | 1/1994 | Frank et al. | |
| 5,606,665 A | 2/1997 | Yang et al. | |
| 5,623,490 A | 4/1997 | Richter et al. | |
| 5,991,302 A | 11/1999 | Berl et al. | |
| 5,995,491 A | 11/1999 | Richter et al. | |
| 6,029,175 A | 2/2000 | Chow et al. | |
| 6,041,365 A | 3/2000 | Kleinerman | |
| 6,047,356 A * | 4/2000 | Anderson et al. | 711/129 |
| 6,067,558 A | 5/2000 | Wendt et al. | |
| 6,104,706 A | 8/2000 | Richter et al. | |
| 6,154,777 A | 11/2000 | Ebrahim | |
| 6,259,405 B1 | 7/2001 | Stewart et al. | |
| 6,260,070 B1 | 7/2001 | Shah | |
| 6,292,832 B1 | 9/2001 | Shah et al. | |
| 6,304,913 B1 | 10/2001 | Rune | |
| 6,330,574 B1 | 12/2001 | Murashita | |
| 6,338,082 B1 | 1/2002 | Schneider | |
| 6,353,848 B1 | 3/2002 | Morris | |
| 6,363,056 B1 | 3/2002 | Beigi et al. | |
| 6,370,527 B1 | 4/2002 | Singhal | |
| 6,389,462 B1 | 5/2002 | Cohen et al. | |

(Continued)

FOREIGN PATENT DOCUMENTS

| | | |
|---|---|---|
| CA | 2080530 A1 | 4/1994 |
| EP | 0605088 A3 | 7/1994 |

(Continued)

OTHER PUBLICATIONS

F5 Networks, Inc., "F5 WANJet CIFS Acceleration, White Paper", Mar. 2006, pp. 1-5.

(Continued)

*Primary Examiner* — Patrice Winder
(74) *Attorney, Agent, or Firm* — LeClairRyan, A Professional Corporation

(57) ABSTRACT

A network traffic management device (NTMD) capable of gracefully handling remote file transfer errors is disclosed. A first local area network (LAN) may include a first NTMD and a client device. A second LAN may include a file server and an optional second NTMD. The first and second LANs are connected by a wide area network. The first NTMD optimizes network file transfer protocol (e.g., CIFS, NFS) operations by locally acknowledging file write command messages from the client device and reliably handling any file transfer errors that may occur by withholding flush data command messages from the client device until determining the locally acknowledged and forwarded file write commands were received by the file server. If any errors are encountered, the first NTMD returns a failed flush message to the client device or terminates the TCP/IP connection between the client device and the file server to indicate the error.

24 Claims, 4 Drawing Sheets

(56) References Cited

U.S. PATENT DOCUMENTS

| | | |
|---|---|---|
| 6,446,108 B1 | 9/2002 | Rosenberg et al. |
| 6,466,580 B1 | 10/2002 | Leung |
| 6,469,983 B2 | 10/2002 | Narayana et al. |
| 6,513,061 B1 | 1/2003 | Ebata et al. |
| 6,514,085 B2 | 2/2003 | Slattery et al. |
| 6,542,936 B1 | 4/2003 | Mayle et al. |
| 6,560,230 B1 | 5/2003 | Li et al. |
| 6,578,069 B1 | 6/2003 | Hopmann et al. |
| 6,615,267 B1 | 9/2003 | Whalen et al. |
| 6,654,346 B1 | 11/2003 | Mahalingaiah et al. |
| 6,701,415 B1 | 3/2004 | Hendren, III |
| 6,728,704 B2 | 4/2004 | Mao et al. |
| 6,738,357 B1 | 5/2004 | Richter et al. |
| 6,744,776 B1 | 6/2004 | Kalkunte et al. |
| 6,754,215 B1 | 6/2004 | Arikawa et al. |
| 6,754,699 B2 | 6/2004 | Swildens et al. |
| 6,760,337 B1 | 7/2004 | Snyder, II et al. |
| 6,795,860 B1 | 9/2004 | Shah |
| 6,865,593 B1 | 3/2005 | Reshef et al. |
| 6,868,447 B1 | 3/2005 | Slaughter et al. |
| 6,871,221 B1 | 3/2005 | Styles |
| 6,880,017 B1 | 4/2005 | Marce et al. |
| 6,883,137 B1 | 4/2005 | Girardot et al. |
| 6,914,881 B1 | 7/2005 | Mansfield et al. |
| 6,928,518 B2* | 8/2005 | Talagala ............ 711/135 |
| 6,970,924 B1 | 11/2005 | Chu et al. |
| 6,973,490 B1 | 12/2005 | Robertson et al. |
| 6,975,592 B1 | 12/2005 | Seddigh et al. |
| 6,990,074 B2 | 1/2006 | Wan et al. |
| 6,990,114 B1 | 1/2006 | Erimli et al. |
| 7,003,564 B2 | 2/2006 | Greuel et al. |
| 7,023,974 B1 | 4/2006 | Brannam et al. |
| 7,039,061 B2 | 5/2006 | Connor et al. |
| 7,065,482 B2 | 6/2006 | Shorey et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,491 B2 | 8/2006 | Feinberg et al. |
| 7,113,996 B2 | 9/2006 | Kronenberg |
| 7,133,863 B2 | 11/2006 | Teng et al. |
| 7,191,163 B2 | 3/2007 | Herrera et al. |
| 7,228,359 B1 | 6/2007 | Monteiro |
| 7,236,491 B2 | 6/2007 | Tsao et al. |
| 7,240,100 B1 | 7/2007 | Wein et al. |
| 7,292,541 B1 | 11/2007 | C S |
| 7,296,263 B1 | 11/2007 | Jacob |
| 7,308,475 B1 | 12/2007 | Pruitt et al. |
| 7,324,533 B1 | 1/2008 | DeLiberato et al. |
| 7,340,572 B2* | 3/2008 | Cochran ............ 711/162 |
| 7,373,438 B1* | 5/2008 | DeBergalis et al. ......... 710/40 |
| 7,409,440 B1 | 8/2008 | Jacob |
| 7,577,723 B2 | 8/2009 | Matsuda et al. |
| 7,895,653 B2 | 2/2011 | Calo et al. |
| 7,908,245 B2 | 3/2011 | Nakano et al. |
| 7,984,500 B1 | 7/2011 | Khanna et al. |
| 8,069,225 B2 | 11/2011 | McCanne et al. |
| 2001/0007560 A1 | 7/2001 | Masuda et al. |
| 2002/0012352 A1 | 1/2002 | Hansson et al. |
| 2002/0038360 A1 | 3/2002 | Andrews et al. |
| 2002/0065848 A1 | 5/2002 | Walker et al. |
| 2002/0087571 A1 | 7/2002 | Stapel et al. |
| 2002/0087744 A1 | 7/2002 | Kitchin |
| 2002/0099829 A1 | 7/2002 | Richards et al. |
| 2002/0103823 A1 | 8/2002 | Jackson et al. |
| 2002/0143819 A1 | 10/2002 | Han et al. |
| 2002/0162118 A1 | 10/2002 | Levy et al. |
| 2002/0174216 A1 | 11/2002 | Shorey et al. |
| 2002/0194112 A1 | 12/2002 | dePinto et al. |
| 2002/0194342 A1 | 12/2002 | Lu et al. |
| 2002/0198956 A1 | 12/2002 | Dunshea et al. |
| 2003/0005172 A1 | 1/2003 | Chessell |
| 2003/0009528 A1 | 1/2003 | Sharif et al. |
| 2003/0018450 A1 | 1/2003 | Carley |
| 2003/0018585 A1 | 1/2003 | Butler et al. |
| 2003/0055723 A1 | 3/2003 | English |
| 2003/0074301 A1 | 4/2003 | Solomon |
| 2003/0105846 A1 | 6/2003 | Zhao et al. |
| 2003/0128708 A1 | 7/2003 | Inoue et al. |
| 2003/0130945 A1 | 7/2003 | Force et al. |
| 2003/0139934 A1 | 7/2003 | Mandera |
| 2003/0156586 A1 | 8/2003 | Lee et al. |
| 2003/0179755 A1 | 9/2003 | Fraser |
| 2003/0191812 A1 | 10/2003 | Agarwalla et al. |
| 2003/0195813 A1 | 10/2003 | Pallister et al. |
| 2003/0212954 A1 | 11/2003 | Patrudu |
| 2003/0220835 A1 | 11/2003 | Barnes, Jr. |
| 2003/0229665 A1 | 12/2003 | Ryman |
| 2003/0236995 A1 | 12/2003 | Fretwell, Jr. |
| 2004/0006591 A1 | 1/2004 | Matsui et al. |
| 2004/0015783 A1 | 1/2004 | Lennon et al. |
| 2004/0017825 A1 | 1/2004 | Stanwood et al. |
| 2004/0030627 A1 | 2/2004 | Sedukhin |
| 2004/0030740 A1 | 2/2004 | Stelting |
| 2004/0043758 A1 | 3/2004 | Sorvari et al. |
| 2004/0059789 A1 | 3/2004 | Shum |
| 2004/0064544 A1 | 4/2004 | Barsness et al. |
| 2004/0064554 A1 | 4/2004 | Kuno et al. |
| 2004/0093361 A1 | 5/2004 | Therrien et al. |
| 2004/0122926 A1 | 6/2004 | Moore et al. |
| 2004/0123277 A1 | 6/2004 | Schrader et al. |
| 2004/0133605 A1 | 7/2004 | Chang et al. |
| 2004/0138858 A1 | 7/2004 | Carley |
| 2004/0167967 A1 | 8/2004 | Bastian et al. |
| 2004/0213156 A1 | 10/2004 | Smallwood et al. |
| 2004/0215665 A1 | 10/2004 | Edgar et al. |
| 2004/0236826 A1 | 11/2004 | Harville et al. |
| 2005/0021703 A1 | 1/2005 | Cherry et al. |
| 2005/0027841 A1 | 2/2005 | Rolfe |
| 2005/0044158 A1 | 2/2005 | Malik |
| 2005/0117589 A1 | 6/2005 | Douady et al. |
| 2005/0165656 A1 | 7/2005 | Frederick et al. |
| 2005/0175013 A1 | 8/2005 | Le Pennec et al. |
| 2005/0198234 A1 | 9/2005 | Leib et al. |
| 2005/0213587 A1 | 9/2005 | Cho et al. |
| 2005/0234928 A1 | 10/2005 | Shkvarchuk et al. |
| 2005/0240664 A1 | 10/2005 | Chen et al. |
| 2005/0256806 A1 | 11/2005 | Tien et al. |
| 2006/0031374 A1 | 2/2006 | Lu et al. |
| 2006/0045096 A1 | 3/2006 | Farmer et al. |
| 2006/0047785 A1 | 3/2006 | Wang et al. |
| 2006/0112367 A1 | 5/2006 | Harris |
| 2006/0123210 A1* | 6/2006 | Pritchett et al. ............. 711/162 |
| 2006/0140193 A1 | 6/2006 | Kakani et al. |
| 2006/0153201 A1 | 7/2006 | Hepper et al. |
| 2006/0259320 A1 | 11/2006 | LaSalle et al. |
| 2006/0268692 A1 | 11/2006 | Wright et al. |
| 2006/0282442 A1 | 12/2006 | Lennon et al. |
| 2007/0005807 A1 | 1/2007 | Wong |
| 2007/0016613 A1 | 1/2007 | Foresti et al. |
| 2007/0124415 A1* | 5/2007 | Lev-Ran et al. ............. 709/217 |
| 2007/0124502 A1 | 5/2007 | Li |
| 2007/0130255 A1 | 6/2007 | Wolovitz et al. |
| 2007/0162891 A1 | 7/2007 | Burner et al. |
| 2007/0168320 A1 | 7/2007 | Borthakur et al. |
| 2007/0233826 A1 | 10/2007 | Tindal et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0208917 A1 | 8/2008 | Smoot et al. |
| 2008/0270578 A1 | 10/2008 | Zhang et al. |
| 2008/0281908 A1* | 11/2008 | McCanne et al. ............. 709/203 |
| 2009/0094311 A1 | 4/2009 | Awadallah et al. |
| 2009/0106413 A1 | 4/2009 | Salo et al. |
| 2009/0125955 A1 | 5/2009 | DeLorme |
| 2009/0217163 A1 | 8/2009 | Jaroker |
| 2009/0217386 A1 | 8/2009 | Schneider |
| 2009/0265396 A1 | 10/2009 | Ram et al. |
| 2009/0292957 A1* | 11/2009 | Bower et al. .................... 714/55 |
| 2009/0300161 A1 | 12/2009 | Pruitt et al. |
| 2009/0319600 A1* | 12/2009 | Sedan et al. ................ 709/203 |
| 2010/0064001 A1 | 3/2010 | Daily |
| 2010/0070476 A1 | 3/2010 | O'Keefe et al. |
| 2010/0179984 A1 | 7/2010 | Sebastian |
| 2010/0228819 A1 | 9/2010 | Wei |

(56) References Cited

U.S. PATENT DOCUMENTS

| | | | |
|---|---|---|---|
| 2010/0250497 | A1 | 9/2010 | Redlich et al. |
| 2010/0274772 | A1* | 10/2010 | Samuels ................ 707/693 |
| 2011/0055921 | A1 | 3/2011 | Narayanaswamy et al. |
| 2011/0066736 | A1 | 3/2011 | Mitchell et al. |
| 2011/0072321 | A1* | 3/2011 | Dhuse ....................... 714/55 |
| 2012/0117028 | A1 | 5/2012 | Gold et al. |
| 2012/0150805 | A1 | 6/2012 | Pafumi et al. |

FOREIGN PATENT DOCUMENTS

| | | |
|---|---|---|
| EP | 1081918 A2 | 3/2001 |
| JP | 06-205006 | 7/1994 |
| JP | 8021924 B | 3/1996 |
| JP | 2000183935 | 6/2000 |
| WO | 00/58870 A2 | 10/2000 |
| WO | 02/39696 A2 | 5/2002 |
| WO | 2006/091040 A1 | 8/2006 |

OTHER PUBLICATIONS

Baer, T., et al., "The elements of Web services" ADTmag.com, Dec. 1, 2002, pp. 1-6, (http://www.adtmag.com).

Woo T.Y.C., "A Modular Approach to Packet Classification: Algorithms and Results", Bell Laboratories, Lucent Technologies, Mar. 2000, pp. 1-10.

"Diameter MBLB Support Phase 2: Generic Message Based Load Balancing (GMBLB)", last accessed Mar. 29, 2010, pp. 1-10, (http://peterpan.f5net.com/twiki/bin/view/TMOS/TMOSDiameterMBLB).

F5 Networks Inc., "Big-IP® Reference Guide, version 4.5", F5 Networks Inc., Sep. 2002, pp. 11-1-11-32, Seattle, Washington.

F5 Networks Inc., "3-DNS® Reference Guide, version 4.5", F5 Networks Inc., Sep. 2002, pp. 2-1-2-28, 3-1-3-12, 5-1-5-24, Seattle, Washington.

F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).

F5 Networks Inc., "Deploying the BIG-IP LTM for Diameter Diameter Traffic Management", F5® Deployment Guide, Publication date Sep. 2010, Version 1.2, pp. 1-19.

F5 Networks Inc., "F5 Diameter RM", Powerpoint document, Jul. 16, 2009, pp. 1-7.

F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).

Wikipedia, "Diameter (protocol)", pp. 1-11, last accessed Oct. 27, 2010, (http://en.wikipedia.org/wiki/Diameter_(protocol)).

Wang B., "Priority and realtime data transfer over the best-effort Internet", Dissertation Abstract, 2005, ScholarWorks@UMASS.

Fajardo V., "Open Diameter Software Architecture," Jun. 25, 2004, pp. 1-6, Version 1.0.7, (http://diameter.sourceforge.net/diameter-architecture/index.html).

Gupta et al., "Algorithms for Packet Classification", Computer Systems Laboratory, Stanford University, CA, Mar./Apr. 2001, pp. 1-29.

Heinz G., "Priorities in Stream Transmission Control Protocol (SCTP) Multistreaming", Thesis submitted to the Faculty of the University of Delaware, Spring 2003, pp. 1-35.

Ilvesjmaki M., et al., "On the capabilities of application level traffic measurements to differentiate and classify Internet traffic", Presented in SPIE's International Symposium ITcom, Aug. 19-21, 2001, pp. 1-11, Denver, Colorado.

Internet Protocol,"Darpa Internet Program Protocol Specification", (RFC:791), Information Sciences Institute, University of Southern California, Sep. 1981, pp. 1-49.

Kawamoto, D., "Amazon files for Web services patent", CNET News.com, Jul. 28, 2005, pp. 1-2, (http://news.com).

LaMonica M., "Infravio spiffs up Web services registry idea", CNET News.com, May 11, 2004, pp. 1-2, (http://www.news.com).

Mac Vittie, L., "Message-Based Load Balancing: Using F5 solutions to address the challenges of scaling Diameter, Radius, and message-oriented protocols", F5 Technical Brief, 2005, pp. 1-9, F5 Networks Inc., Seattle, Washington.

"Market Research & Releases, CMPP PoC documentation", last accessed Mar. 29, 2010, (http://mainstreet/sites/PD/Teams/ProdMgmt/MarketResearch/Universal).

"Market Research & Releases, Solstice Diameter Requirements", last accessed Mar. 29, 2010, (http://mainstreet/sites/PD/Teams/ProdMgmt/MarketResearch/Unisversal).

Modiano E., "Scheduling Algorithms for Message Transmission Over a Satellite Broadcast System", MIT Lincoln Laboratory Advanced Network Group, Nov. 1997, pp. 1-7.

Nichols K., et al., "Definition of the Differentiated Services Field (DS Field) in the IPv4 and IPv6 Headers", (RFC:2474) Network Working Group, Dec. 1998, pp. 1-19, (http://www.ietf.org/rfc/rfc2474.txt).

Ott D., et al., "A Mechanism for TCP-Friendly Transport-level Protocol Coordination", USENIX Annual Technical Conference, 2002, University of North Carolina at Chapel Hill, pp. 1-12.

Padmanabhan V., et al., "Using Predictive Prefetching to Improve World Wide Web Latency", SIGCOM, 1996, pp. 1-15.

"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).

Rosen E., et al., "MPLS Label Stack Encoding", (RFC:3032) Network Working Group, Jan. 2001, pp. 1-22, (http://www.ietf.org/rfc/rfc3032.txt).

Schilit B., "Bootstrapping Location-Enhanced Web Services", University of Washington, Dec. 4, 2003, (http://www.cs.washington.edu/news/colloq.info.html).

Seeley R., "Can Infravio technology revive UDDI?", ADTmag.com, Oct. 22, 2003, (http://www.adtmag.com).

Shohoud, Y., "Building XML Web Services with VB .NET and VB 6", Addison Wesley, 2002, pp. 1-14.

Sommers F., "Whats New in UDDI 3.0—Part 1", Web Services Papers, Jan. 27, 2003, pp. 1-4, (http://www.webservices.org/index.php/article/articleprint/871/-1/24/).

Sommers F., "Whats New in UDDI 3.0—Part 2", Web Services Papers, Mar. 2, 2003, pp. 1-8, (http://www.web.archive.org/web/20040620131006/).

Sommers F., "Whats New in UDDI 3.0—Part 3", Web Services Papers, Sep. 2, 2003, pp. 1-4, (http://www.webservices.org/index.php/article/articleprint/894/-1/24/).

Sleeper B., "The Evolution of UDDI: UDDI.org White Paper", The Stencil Group, Inc., Jul. 19, 2002, pp. 1-15, San Francisco, California.

Sleeper B., "Why UDDI Will Succeed, Quietly: Two Factors Push Web Services Forward", The Stencil Group, Inc., Apr. 2001, pp. 1-7, San Francisco, California.

"UDDI Overview", Sep. 6, 2000, pp. 1-21, uddi.org, (http://www.uddi.org/).

"UDDI Version 3.0.1 UDDI Spec Technical Committee Specification", Oct. 14, 2003, pp. 1-383, uddi.org, (http://www.uddi.org/).

"UDDI Technical White Paper," Sep. 6, 2000, pp. 1-12, uddi-org, (http://www.uddi.org/).

Blue Coat Systems, Inc., "Technology Primer: CIFS Protocol Optimization", 2007.

F5 Networks, Inc., "Case Information Log for 'Issues with BoNY upgrade to 4.3'", as early as Feb. 2008.

* cited by examiner

METHOD FOR OPTIMIZING REMOTE FILE SAVES IN A FAILSAFE WAY

TECHNOLOGICAL FIELD

The technology generally relates to network communications, and more particularly, to optimizing remote file transaction error handling in a network.

BACKGROUND

Transmitting files over networks from client applications to file servers can be affected by network latency. The network TCP/IP protocols were not originally intended to be used for file transfers. Thus, file transfer optimized protocols, such as the Common Internet File Sharing (CIFS) protocol and the Network File Sharing (NFS) protocol, were developed. While these protocols enable reliably transmitting files over TCP/IP networks, network applications involved in these file transfers still face many challenges dealing with the network latency related issues.

SUMMARY

According to the various disclosed examples provided herein, a network traffic management device is capable of gracefully handling errors that may occur during an optimized file transfer operation, such as a remote CIFs protocol file save operation. An example system environment employing the network traffic management device includes a first local area network (LAN) with a first network traffic management device and one or more client devices, and a second LAN with one or more file servers and an optional second network traffic management device. Further, the first and second LANs are geographically separated by a wide area network (WAN), such as the Internet, with a relatively higher latency than at least the first LAN.

The first network traffic management device is capable of optimizing network file transfer protocol (e.g., CIFS, NFS) operations by locally acknowledging file write command messages sent from the client device and destined for the file server in the second LAN. Further, the network traffic management device can reliably handle any file transfer errors that may occur by withholding flush data command messages from the client device until determining the locally acknowledged and forwarded file write commands were received by the file server. If any errors are encountered, the network traffic management device returns a failed flush message to the client device and/or terminates the TCP/IP connection established between the client device and the file server to cause the client device to generate an error indication alerting a client user that the file save operation failed, for example.

More specifically, a client application on the client device in the first LAN desires saving a local version of a file being worked on by the client application that is remotely stored at the file server in the second LAN. The client application initiates the file save operation by sending the network traffic management device one or more network file protocol write command messages in a CIFs protocol, for example, which each include a portion of the entire file desired to be saved. As the network traffic management device receives each file portion, it preemptively acknowledges successful receipt of the network file protocol write command messages on behalf of the file server to the client device and forwards the write command messages towards the file server. Since the first LAN where the client device and the network traffic management device are located has relatively lower latency than the WAN separating it from the second LAN where the file server is located, the client device receives the preemptive acknowledgement messages from the network traffic management device much sooner than it would otherwise from the file server in most if not all cases. This enables the client device to quickly send the remaining file portions towards the file server instead of losing time waiting for acknowledgements from the file server located across the higher latency WAN in the second LAN. Moreover, as the file server receives the file portions over the WAN it buffers them in a temporary memory location.

Once the client device sends all the file portions of the file to be saved towards the file server, it sends one or more flush data command messages to indicate the file server may complete the file save operation and store the file in a permanent file server storage location. When these flush data command messages are received by the network traffic management device, however, they are not immediately forwarded towards the file server. The network traffic management device instead selectively forwards such flush data command messages towards the file server upon determining the file server successfully received the forwarded network file protocol write command messages.

If an error occurs during the file save operation and the network traffic management device does not receive a successful write command acknowledgment from the file server, then the network traffic management device can terminate the TCP/IP connection between the client device and the file server and/or send a flush command failure message to the client device to cause the client application to generate an error message for the user. Otherwise, if the network traffic management device determines that the file server successfully received all the file protocol write command messages, it forwards the flush data command towards the file server to instruct the file server to complete the file save operation and store the file. If errors occur resulting in the file server being unable to successfully execute the flush command and either returning a flush command failure result message or not returning any flush command result message, then again the network traffic management device can terminate the TCP/IP connection and/or send a flush command failure message to the client device to cause the client application to generate an error message for the user.

As such, this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. As such, additional aspects will be apparent to those of ordinary skill in the art in view of the detailed description of various embodiments, which is made with reference to the drawings, a brief description of which is provided below.

Figure 1:
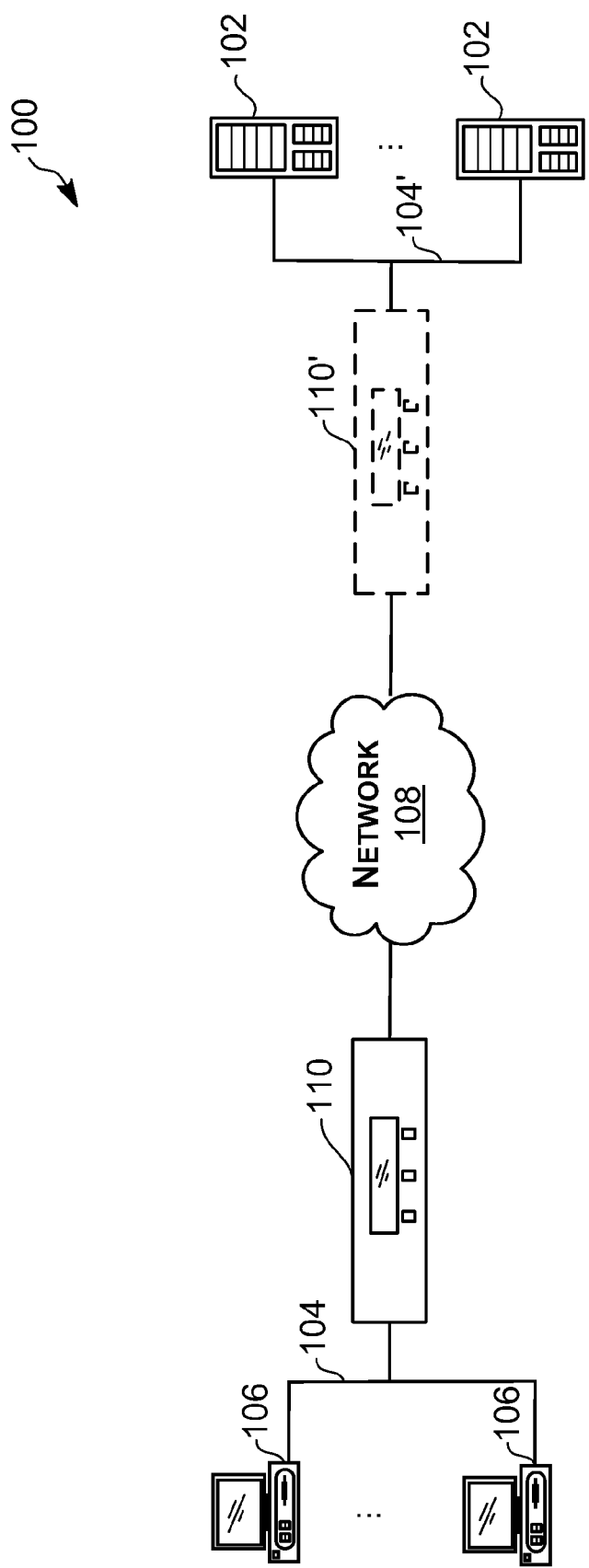
FIG. 1 is a diagram of an example system environment that includes one or more network traffic managers configured to handle optimized remote file operation related errors.

While these examples are susceptible to illustration in many different forms, there is shown in the drawings and will herein be described in detail several examples with the understanding that the present disclosure is to be considered as an exemplification and is not intended to limit the broad aspect to the illustrated examples.

DETAILED DESCRIPTION

When files are transmitted over TCP/IP networks using file transfer optimized protocols, such as the CIFs protocol, the files are typically broken up into a number of portions and sequentially sent portions at a time. However, each file portion typically will not be transmitted by the file sender, such as a client application, until the sender determines a previously transmitted file portion was successfully received by the destination. If any of the file portions are not successfully received, then the nature of these file transfer optimized protocols generally require restarting the file transfer from scratch.

In an organization with many client applications accessing files stored in remotely located file servers, at the very least productivity may be deprecated and at the very worst data may be lost when these file transfer errors occur. Attempts to ameliorate these issues can involve using specialized network acceleration equipment configured to optimize an organization's network traffic. For instance, some of these solutions cache content, such as files, transferred over an organization's network. When a file transfer error occurs, the given file portion that was not successfully received may be retrieved from a cache memory and retransmitted to complete the file transaction. A potential problem with this approach is that the cached data may not be the most current and thus data loss may Occur.

Other specialized network acceleration equipment, however, optimize an organization's network traffic in other ways without caching file level content. In response to a file transfer error these solutions are not even able to simply retransmit the lost file portions. Consequently, these solutions face other challenges in not only optimizing file transfer operations but reliably handling errors when they occur without increasing the risk of data loss. As such, the exemplary system environment 100 shown in FIG. 1 employs a traffic management device 110 that is capable of reliably handling file transfer errors that may occur in an optimized file transfer environment.

An exemplary system environment 100 shown in FIG. 1 includes one or more file servers 102, a first local area network (LAN) 104, a second LAN 104', one or more client devices 106, a network 108, a first traffic management device 110, and an optional second traffic management device 110', although the environment 100 could include other numbers and types of devices in other arrangements. Generally, the first traffic management device 110 is capable of reliably handling file transfer errors that may occur during optimized file save operations involving the client device 106 and file server 102, as will be described in further detail below in connection with FIGS. 3-4. In this example, client devices 106 and the traffic management device 110 belong to a first local area network (LAN) 104, and the file servers 102 and optional second traffic management device 110' belong to a second LAN 104'. When the optional second traffic management device 110' is not utilized, the second LAN 104' includes just the file servers 102. While not shown, it is to be understood that the exemplary system environment 100 also includes additional intermediate network devices including routers, switches, hubs, gateways, bridges, and other devices that may act as links within and between LANs 104, 104', network 108 and the network traffic management devices 110, 110'.

Referring more specifically to FIG. 1, file server 102 comprises one or more server computing devices capable of operating one or more file server applications or operating systems (e.g., Windows® Server suite). Further, the file server 102 may be accessed by network devices over the network 108, such as client devices 106 via the first traffic management device 110 and the second optional traffic management device 110', to request and receive files from the server 102 using one or more network file protocols, including CIFs and NFS, although the server 102 may provide other types of requested data representing other requested resources, such as Web page(s), image(s) of physical objects and other objects, and the server 102 may perform other tasks. It should be noted that while only two file servers 102 are shown in the environment 100 depicted in FIG. 1, other numbers and types of servers may be coupled to the network traffic management device 110. It is also contemplated that one or more of the file servers 102 may be a cluster of servers managed by the network traffic management device 110.

First LAN 104 comprises a private local area network that includes the first network traffic management device 110 coupled to the one or more client devices 106, although the LAN 104 may comprise other types of networks with other devices. Any network communication medium or links may be used in the first LAN 104 to interconnect the client devices 106 and the first network traffic management device 110 to each other and with the network 108, including twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts.

Second LAN 104' comprises a private local area network identical to the first LAN 104, except the second LAN 104' in this example optionally includes a second network traffic management device 110' as well as the file servers 102, and the second LAN 104' may include other numbers and types of network devices arranged in other manners. Networks, including local area networks, besides being understood by those skilled in the relevant arts, have already been generally described above in connection with the first LAN 104, and thus will not be described further.

Client devices 106 comprise computing devices capable of connecting to network devices, such as the first network traffic management device 110, the optional second network traffic management device 110' and the file servers 102, over the network 108, to request and receive files from the server 102 using one or more network file protocols, although the client devices 106 may request other objects or resources from the servers 102. Examples of client devices 106 include personal computers (e.g., desktops, laptops), mobile and/or smart phones, and the like. In this example, client devices 106 run client applications (e.g., Microsoft® Word, Microsoft® Excel, etc.), which allow human user operators to remotely access (e.g., open, close, delete, update and save) files stored or otherwise accessible to the file servers 102, although client devices 106 may run other applications and perform other functions, such as Web browsers, for making requests for resources to different web server-based applications or Web pages via the network 108.

Network 108 comprises a publicly accessible wide area network, such as the Internet in this example, although the network 108 may comprise other types of private and public networks. Communications, such as file operation requests including open, save, close, or delete files from clients 106, and responses from files servers 102 relating to file operation requests from clients 106, are transmitted over the network 108 according to standard network protocols, such as the HTTP, CIFS, and TCP/IP protocols in this example, but the principles discussed herein are not limited to this example and can include other numbers and types of protocols.

Generally, the first network traffic management device 110 manages network communications in the first LAN 104 involving the client devices 106 and other network devices outside the LAN 104 (i.e., over network 108), such as the network devices in the second LAN 104' (e.g., optional second network traffic management device 110' and file servers 102). Requests from the client devices 106, such as file operation requests destined for file servers 102, may take the form of TCP/IP data packets carrying one or more CIFs protocol messages with data relating to the file operation requests, which pass through one or more intermediate network devices and/or intermediate networks in network 108 until ultimately reaching the optional second traffic management device 110' and file servers 102 in the second LAN 104', although again other protocols may be used, such as NFS. In any case, the first network traffic management device 110 may manage the network communications by performing several network traffic related functions involving these communications, such as optimizing the communications other functions, including server load balancing and access control, for example.

Figure 2:
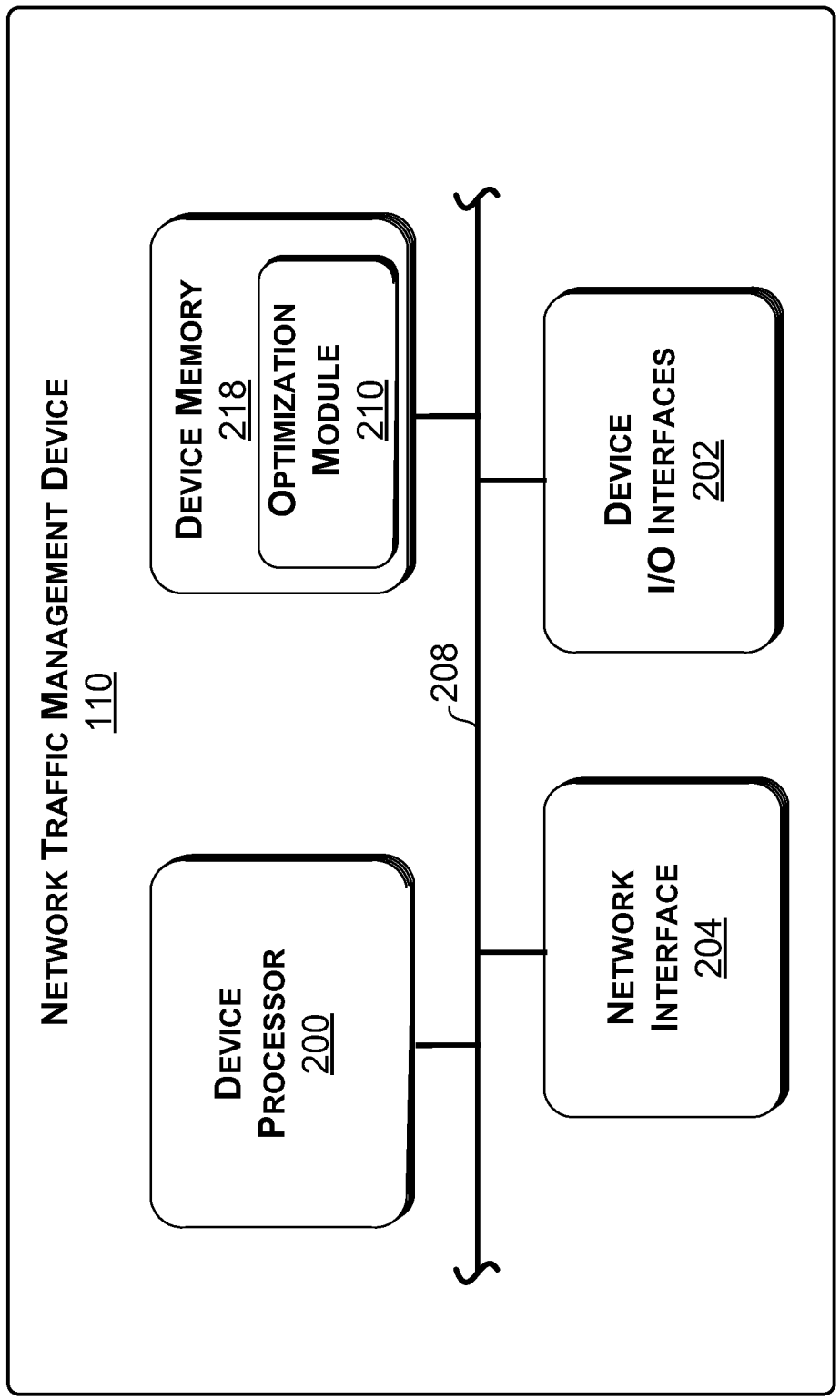
FIG. 2 is a block diagram of the example network traffic managers shown in FIG. 1.

Referring now to FIG. 2, an example first network traffic management device 110 includes a device processor 200, device I/O interfaces 202, network interface 204 and device memory 218, which are coupled together by bus 208, although the device 110 could include other types and numbers of components. Device processor 200 comprises one or more microprocessors configured to execute computer/machine readable and executable instructions stored in device memory 218 to implement network traffic management related functions of the first network traffic management device 110 in addition to implementing optimization module 210 to perform one or more portions of the processes illustrated in FIG. 3 to reliably handle file transfer errors, although processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like.

Device I/O interfaces 202 comprise one or more user input and output device interface mechanisms, such as a computer keyboard, mouse, display device, and the corresponding physical ports and underlying supporting hardware and software to enable the first network traffic management device 110 to communicate with the outside environment for accepting user data input and to provide user output, although other types and numbers of user input and output devices may be used. Alternatively or in addition, as will be described in connection with network interface 204 below, the first network traffic management device 110 may communicate with the outside environment for certain types of operations (e.g., configuration) via a network management port, for example.

Network interface 204 comprises one or more mechanisms that enable the first network traffic management device 110 to engage in TCP/IP communications over LAN 104 and network 108, although the network interface 204 may be constructed for use with other communication protocols and types of networks. Network interface 204 is sometimes referred to as a transceiver, transceiving device, or network interface card (NIC), which transmits and receives network data packets to one or more networks, such as first LAN 104 and network 108 in this example; and where the first network traffic management device 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the first network traffic management device 110 with other network devices, such as the second optional traffic management device 110' and the file servers 102. Moreover, the interface 204 may include certain physical ports dedicated to receiving and/or transmitting certain types of network data, such as device management related data for configuring the first network traffic management device 110.

Bus 208 may comprise one or more internal device component communication buses, links, bridges and supporting components, such as bus controllers and/or arbiters, which enable the various components of the first network traffic management device 110, such as the processor 200, device I/O interfaces 202, network interface 204, and device memory 218, to communicate, although the bus may enable one or more components of the first network traffic management device 110 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses may be used and the particular types and arrangement of buses will depend on the particular configuration of the first network traffic management device 110.

Device memory 218 comprises computer readable media, namely computer readable or processor readable storage media, which are examples of machine-readable storage media. Computer readable storage/machine-readable storage media may include volatile, nonvolatile, removable, and non-removable media implemented in any method or technology for storage of information, such as computer readable/machine-executable instructions, data structures, program modules, or other data, which may be obtained and/or executed by one or more processors, such as device processor 200, to perform actions, including implementing an operating system for controlling the general operation of the first network traffic management device 110 to manage network traffic and implementing optimization module 210 to perform one or more portions of the processes illustrated in FIG. 3 to reliably handle file transfer errors, for example, although some or all of the programmed instructions could be stored and/or executed elsewhere, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer/machine-executable instructions, and which can be accessed by a computing or specially programmed device, such as the first network traffic management device 110. When the instructions stored in device memory 218 are run by the device processor 200, the first network traffic management device 110 implements the optimization module 210 to perform at least a portion of the processes in FIG. 3 for reliably handling file transfer errors as well as to perform other network traffic management related functions, including firewall functions, server load balancing functions, device configuration functions (e.g., defining network security policies). While the optimization module 210 in FIG. 2 is depicted as being within memory 218, it should be appreciated that the module 210 may be alternatively located elsewhere and may comprise one or more other software components.

When a second optional network traffic management device 110' is used in the second LAN 110', the second device 110' may include the identical components arranged in the same manner as described above in connection with the first network traffic management device 110, although the device could include other numbers and types of components arranged in other manners. Such a second network traffic management device 110' would be configured to cooperatively communicate with the first network traffic management device 110 over the network 108 to optimize network communications taking place between network devices in the first LAN 104 (e.g., client devices 106) and the second LAN 104' (e.g., file servers 102).

As such, an exemplary process 300 for reliably handling file transfer errors, which may be implemented using the first network traffic management device 110 in the example system environment 100 described above in connection with FIGS. 1-2, will now be described below with reference to FIGS. 3-4. The process may be performed using just the first network traffic management device 110, although the process may be performed using the optional second network traffic management device 110'. Where appropriate, the role of the optional second network traffic management device 110' in the exemplary process will be described throughout the ensuing process descriptions if the optional second device 110' is employed.

Figure 3:
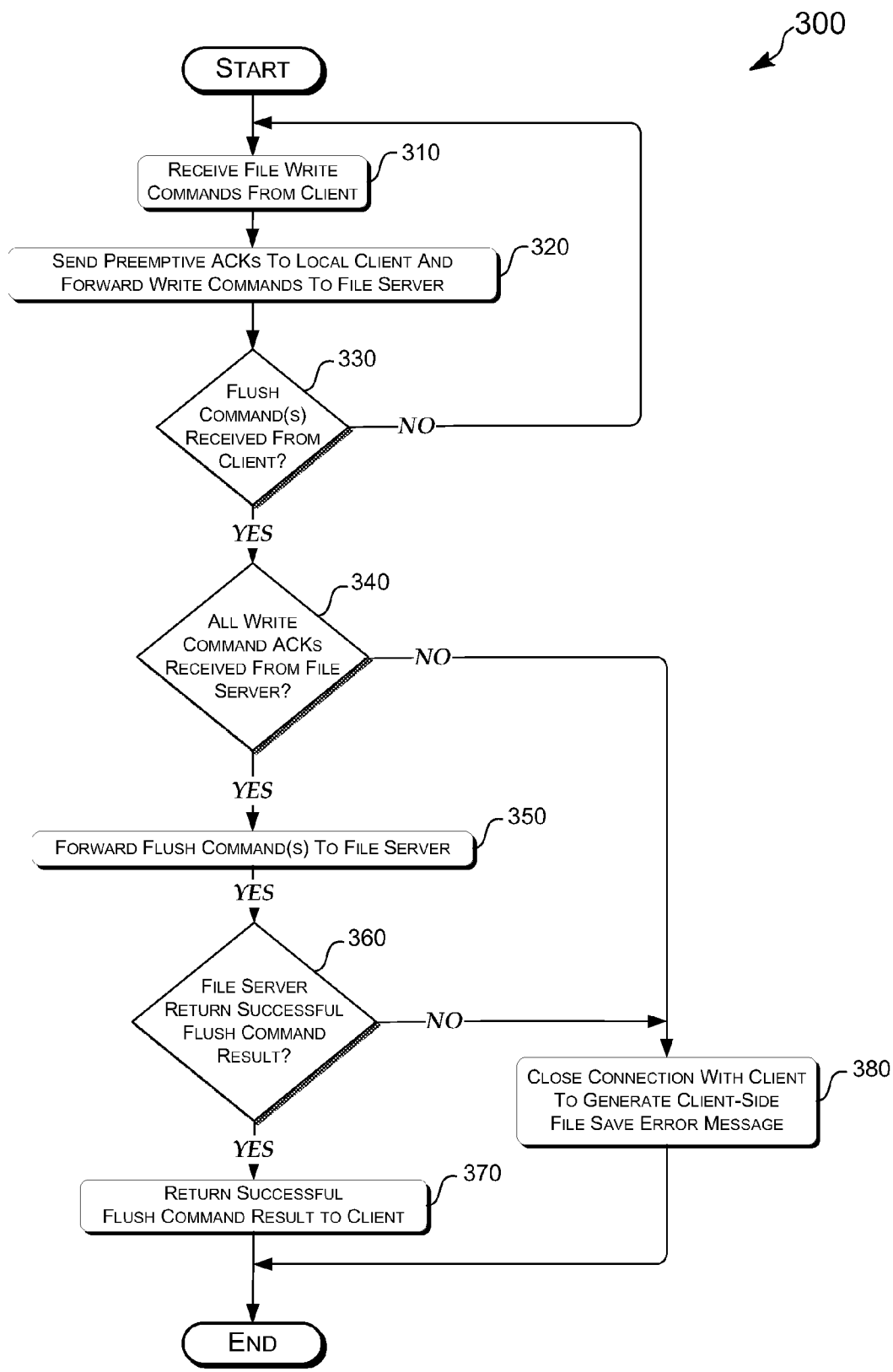
FIG. 3 is a flow chart diagram of an example process for handling optimized remote file operation related errors.

Referring now to FIG. 3, and beginning at step 310, the network traffic management device 110 may receive one or more CIFs file write data requests destined for servers 102 from one or more of the client devices 106 shown in FIG. 1. For example, a user operating the client device 106 may be utilizing a running client application, such as a spreadsheet program (e.g., Microsoft® Excel), which accesses or otherwise interacts with one or more files (e.g., spreadsheet files) remotely stored in another device located across the network 108, such as one of the file servers 102, although the user may be performing some other operation that may involve the user directly accessing or interacting with the file, such as opening the file using an operating system file browsing interface (e.g., Windows® Explorer).

In this example, the running client application is capable of requesting, negotiating and establishing CIFs protocol communication connections with the file servers 102 and exchanging CIFs protocol messages through established connections over the network 108, although again other network file protocols may be utilized and the first network traffic management device 110 may perform portions of the requesting, negotiating and establishing of the communication connection. For example, the client application may initially open a file stored at server 102 by parsing the full file name specified by the client application (or user) to determine the server name (e.g., file server 102), and the relative file name within that server, then resolve the server name to a transport address (although this may be cached), and make a connection to the server if there is no existing connection already established between the client application on client device 106 and a file server application running on the file server 102, for example. Moreover, the first network traffic management device 110 may perform one or more of these preliminary functions on behalf of the client application operating on the client device 106.

In any event, with an established connection, CIFS messages may be exchanged over network 108 between client devices 106, first network management device 110, optional second network management device 110', and file servers 102, in connection with the file interaction operations in the manner described herein below. With an established connection, a file stored at the file server 102, for example, may be requested by the client device 106, transmitted from the server 102 to the client 106 over the network 108, stored in a client local memory for use by the client application on the client device 106, and interacted with in some manner, such as by editing the file contents. At some point during the interaction with the file, the client application (or user) may request saving the file. In response to the file save request, the running client application, in conjunction with a client network (i.e., TCP/IP) stack implemented on the client device 106 and in accordance with the CIFs protocol, begins transmitting one or more CIFs protocol write data command messages.

As is well understood by those skilled in the relevant arts, a file save operation involving a remotely stored file taking place over a network using the CIFs protocol, for example, typically involves the requestor, such as a client application operating on the client device 106 in this example, breaking apart a locally stored version of the file into one or more portions to be transmitted as one or more CIFs protocol write data command messages. The nature of the CIFs protocol normally involves sequentially sending each successive write data command message containing a file portion after receiving an acknowledgement message indicating each file portion was successfully received by the intended recipient, such as the file server 102, before sending the next file portion. With a high latency network like the example network 108 separating the client device 106 and file server 102, this latency can introduce a high amount of delay resulting in reduced productivity and a deprecated user experience. As will become apparent in the ensuing descriptions, however, the first traffic management device 110 is not only capable of optimizing this process but can expediently and reliably handle errors that may occasionally occur in a graceful manner without requiring any programmatic client-side or server-side changes to any of the client and server applications involved.

Figure 4:
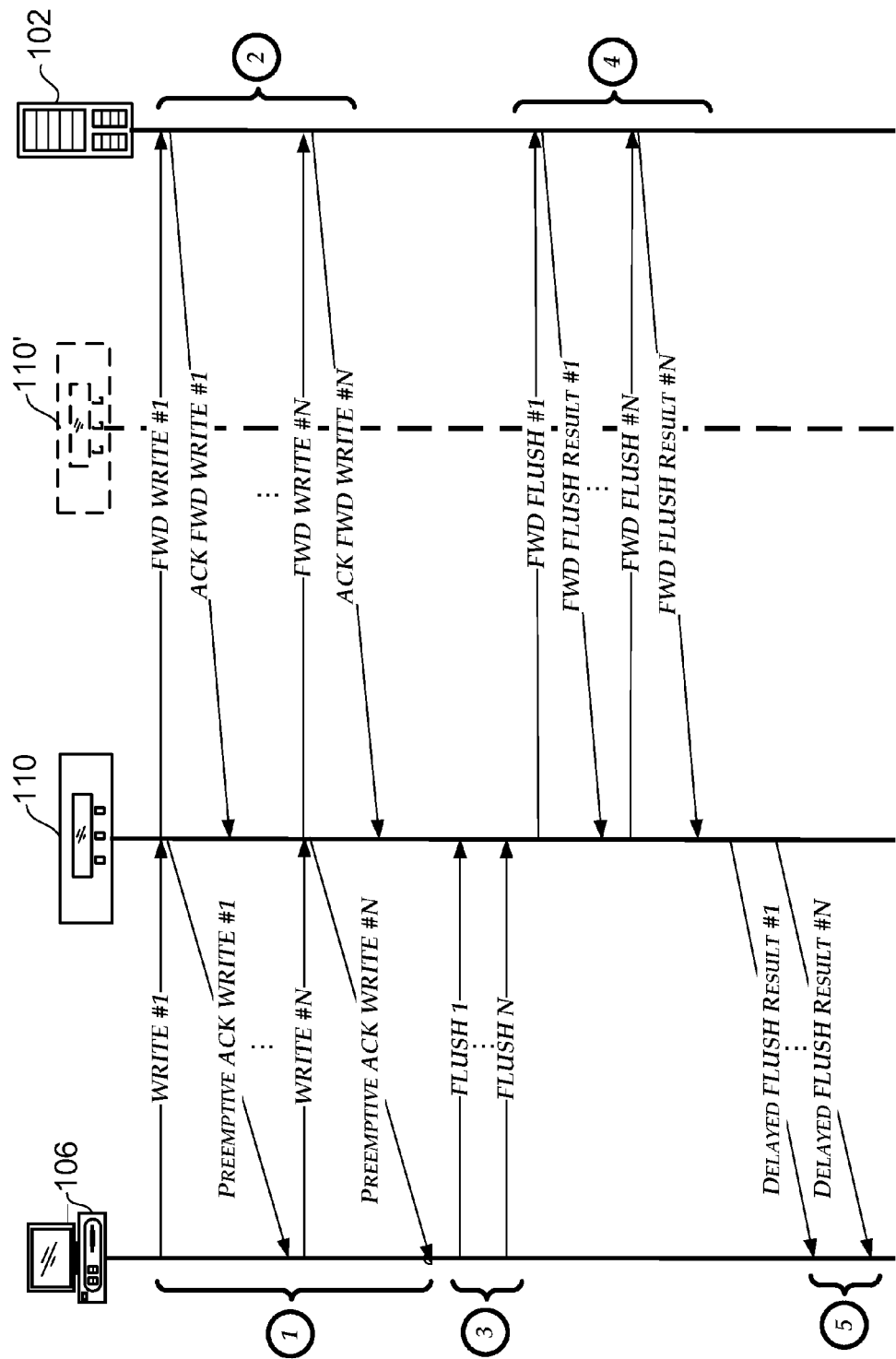
FIG. 4 is a sequence diagram illustrating example network communications taking place during an example optimized remote file operation.

Referring to FIG. 4, an example of this portion of the file save operation exchange is shown adjacent to circle 1 as WRITE #1 through WRITE #N. It should be noted that FIG. 4 is provided for exemplary purposes only and should not be construed to impose any sort of temporal or process sequence order limitations on any of the example process descriptions herein. Further, the ensuing descriptions occasionally refer back to FIG. 4 for ease of description and clarity only. In any event, as will be described in greater detail herein below, the first portion of the file desired to be saved by client device 106 is shown in FIG. 4 as WRITE #1 and the last remaining file portion is shown as WRITE #N. It should also be noted that throughout this disclosure the terms "CIFs protocol write command messages," "write data command messages," "write data command file portion" and "file portions" are used interchangeably to refer to the same thing, namely CIFs protocol write command messages in these examples.

At step 320, the first network traffic management device 110 receives the one or more CIFs protocol write command messages (e.g., WRITE #1, . . . , WRITE #N) from the client device 106, again an example of which is shown in FIG. 4 at circle 1. First network traffic management device 110 inspects the data packets carrying the CIFs messages to determine the intended file server 102 that the messages are destined for and other file transaction related information by examining the packet headers, for example. First network traffic management device 110 then sends a preemptive acknowledge message to the client device 106, shown in FIG. 4 as PREEMPTIVE ACK WRITE #1 through PREEMPTIVE ACK WRITE #N at circle 1, in response to each write command message that is received.

From the perspective of the client device 106, it appears as if the write command messages containing the file portions are being successfully received by the file server 102, and thus the client 106 will progressively send the remaining file portions to the first network traffic management device 110. Since the client device 106 and the first network traffic management device 110 belong to LAN 104 in this example, which presumably has lower latency relative to the higher latency network 108, sending the preemptive acknowledge messages causes the client device 106 to send the write command messages in less time than might otherwise be possible if the client device 106 was required to wait for acknowledge messages from the file servers 102 located across the higher latency network 108.

In any case, the first network traffic management device 110 forwards the write data command messages received from client device 106 to the file server 102, which is shown in FIG. 4 as FWD WRITE #1 through FWD WRITE #N at circle 2, in response to each write command message that is received. It should be appreciated that the first network traffic management device 110 may operate as a full proxy, and thus may be able to establish a separate CIFS protocol connection with the file server 102 on behalf of the client device 106. Thus, the client device 106 would establish its CIFs protocol connection with the first network traffic management device 110; although it may appear to the client device 106 that it is establishing the CIFs connection directly with the file server 102. In such a case, the first network traffic management device 110 would establish a separate CIFs protocol connection with the file server 102 and send write data command messages as if it were the client device 106 directly sending the messages. Alternatively, however, the first network traffic management device 110 may not establish a separate CIFs connection with the file server 102 and may simply forward the data packets carrying the CIFs messages from the client device 106 while making modifications to the packets as needed to ensure responses are sent back to the network traffic management device 110 to be forwarded back to the client device 106, for example.

It should be noted that as the file server 102 receives the write command messages (e.g., FWD WRITE #1 . . . FWD WRITE #N) from the first network traffic management device 110 over the network 108, the file server 102 responds by sending acknowledgement messages indicating whether the write command messages were successfully received or whether a failure occurred. In the example sequence diagram shown in FIG. 4, these acknowledgement messages from the file servers 102 are shown as ACK FWD WRITE #1 through ACK FWD WRITE #N at circle 2. Moreover, the file server 102 buffers the file portions included in the successfully received write command messages in a temporary memory of the file server 102 for further processing, an example of which is described below in connection with step 350. If just the first network traffic management device 110 is used in this example, the various write and acknowledgement messages are received/sent directly by/to the file server 102. If the optional second network traffic management device 110' is employed, the optional device 110' may passively forward the various write and acknowledgement messages to/from the file server 102, although the second optional device 110' may send its own preemptive acknowledgement messages to the first network traffic management device 110 on behalf of the file server 102 rather than waiting to receive the actual acknowledgement from the server 102.

At decision box 330, if the first network traffic management device 110 receives one or more CIFs protocol flush command messages from the client device 106, then the client device 106 has completed sending the CIFs protocol write command messages (e.g., WRITE #1, . . . , WRITE #N) representing the entire file to be saved by the file server 102 in this example, and the YES branch is followed to decision box 340. The number of CIFs protocol flush command messages sent by the client device 106 is dependent on the client application operating on the client device 106. Since it appears to the client device 106 at this portion of the example process that the file server 102 has successfully received the write command messages, the client device 106 may send these flush commands, shown in FIG. 4 as FLUSH #1 through FLUSH #N at circle 3, for the purpose of instructing the file server 102 to commit the buffered portions of the file to be saved to a non-volatile memory storage location, such as a hard drive or other storage medium, within a file system of the server 102, to complete the file save operation.

However, as will be described in connection with decision box 340 below, the first network traffic management device 110 does not immediately forward these flush data command messages to the file servers 102 but holds on to or withholds sending the flush command messages until it can determine whether the file server 102 has successfully received the file portions constituting the entire file involved in the exemplary file save operation. Otherwise, if at decision box 330 the first network traffic management device 110 has not received one or more CIFs protocol flush command messages from the client device 106, then the NO branch is followed back to step 310.

Further, as mentioned above client applications operating on the client device 106 may be configured a variety of ways with regard to sending the flush data command messages, and some client applications may even be configured to send close file command messages instead of flush data command messages. Such a client application may leave it to the file server 102 to determine that the file save operation has been completed and to store the file. In such a case, the first network traffic management device 110 instead holds on to or withholds sending a successful close command result message to the client device 106, in place of the delayed flush command result messages to be described later in step 370 further herein below, and performs the other steps described herein otherwise in the same manner except the device 110 may optionally send the flush data command message to the file server 102.

At decision box 340, if the first network traffic management device 110 determines that acknowledgement messages (e.g., ACK FWD WRITE #1, . . . , ACK FWD WRITE #N) indicating each write data command message (e.g., FWD WRITE #1, . . . , FWD WRITE #N) sent to the file server 102 was received successfully, then the YES branch is followed to step 350. Otherwise, if the first network traffic management device 110 receives at least one acknowledgement message indicating one of the write data command messages was not successfully received by the file server 102, or if the device 110 does not receive an acknowledgement message for any one of the write command messages after a predetermined amount of time has passed, then the NO branch is followed to step 390.

At step 350, the first network traffic management device 110 sends one or more forwarded flush command messages to the file server 102, shown in FIG. 4 as FWD FLUSH #1 through FWD FLUSH #N at circle 4, based on the flush command messages received from client device 106 (e.g., FLUSH #1, . . . , FLUSH #N).

At decision box 360, if the first network traffic management device 110 receives forwarded flush command result messages (e.g., FWD FLUSH RESULT #1, . . . , FWD FLUSH RESULT #N) indicating each forwarded flush command message (e.g., FWD FLUSH #1 . . . FWD FLUSH #N) sent to the file server 102 at step 350 above was performed successfully, then the YES branch is followed to step 370. An indication that the forwarded flush commands were performed successfully means that the file server 102 flushed the buffered file portions from a volatile memory and committed the entire file to memory storage accessible to the file server 102 to successfully complete the requested file save operation. Otherwise, if the first network traffic management device 110 does not receive any flush command result message at all from the file server 102 after a predetermined amount of time has passed, or the device 110 receives at least one forwarded flush command result message indicating the forwarded flush command was not performed successfully by the file server 102, then the NO branch is followed to step 380.

At step 370, the first network traffic management device 110 sends one or more delayed flush command result messages to the client device 106, shown in FIG. 4 as DELAYED FLUSH RESULT #1 through DELAYED FLUSH RESULT #N at circle 5, indicating each of the flush data command messages initially sent by the client device 106 (e.g., FLUSH #1, . . . , FLUSH #N), but forwarded by the device 110 to the file server 102 (e.g., FWD FLUSH #1, . . . , FWD FLUSH #N), were successfully performed by the file server 102 to complete the file save operation. As described above in connection with step 360, the first network traffic management device 110 is capable of making such a determination based on the forwarded flush command result messages (e.g., FWD FLUSH RESULT #1, . . . , FWD FLUSH RESULT #N) indicating each forwarded flush command message (e.g., FWD FLUSH #1 . . . FWD FLUSH #N) sent to the file server 102 was performed successfully. The example process 300 may end at this point and the client application operating on the client device 106 may continue operating normally under the assumption that the file server 102 successfully completed the file save operation.

At step 380, the first network traffic management device 110 closes the TCP/IP connection between the client device 106 and file server 102 over which the CIFs connection is established because the device 110 determined that the file server 102 did not successfully perform the forwarded flush commands (e.g., FWD FLUSH #1, . . . , FWD FLUSH #N) at decision box 360.

At step 390, the first network traffic management device 110 sends one or more fake or delayed flush command result messages to the client device 106 (e.g., DELAYED FLUSH RESULT #1, . . . , DELAYED FLUSH RESULT #N), on behalf of the file server 102, indicating to the client device 106 that the file server 102 did not successfully receive at least one of the write data command messages (e.g., FWD WRITE #1, . . . , FWD WRITE #N), as determined at step 340. Moreover, the first network traffic management device 110 does not forward any flush command messages to the file server 102 (e.g., FWD FLUSH #1, . . . , FWD FLUSH #N), as they are no longer needed since the file save operation has essentially failed at this point, and the process 300 may end.

As such, the client application operating on the client device 106 may respond to the fake delayed flush command failure response from the first network traffic management device 110 by generating an error message indicating to a user that the file save operation was not successfully completed, for example. Thus at this point, the process 300 may be repeated in the event the client device 106 attempts to perform the file save operation again, and/or the process 300 may not be repeated in the event the user of the client device 106 decides to locally save the file at the client device 106, and/or the device 110 may be configured to not repeat the process 300 if the device 110 determines that the user of client device 106 is requesting to perform the same file save operation after such a failed file save operation.

It should be appreciated that one or more of the above-described components of the example network traffic management device 110 could be implemented by software, hardware, firmware, and combinations thereof. Also, some or all of the machine/computer readable and executable instructions, example portions of which are represented by the optimization module 210 in FIG. 2 and the flowchart in FIG. 3, may be implemented in cooperation with one or more devices and/or processors in other devices. Further, although the example processes are described with reference to the optimization module 210 in FIG. 2 and the flowchart in FIG. 3, persons of ordinary skill in the computer, software and/or networking arts will readily appreciate that many other alternative methods of implementing the example machine readable and executable instructions may be used. For example, the order of execution of the process blocks may be changed, and/or some of the blocks described may be changed, eliminated and/or combined.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the examples. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for handling network file transfer errors, the method comprising:

forwarding one or more network file protocol write command messages received from a client device in a first network to a file server in a second network from an intermediate network device in the first network in connection with a file transfer operation;

sending one or more preemptive acknowledgements from the intermediate network device to the client device in response to each of the received network file protocol write command messages;

withholding forwarding one or more flush data command messages destined for the file server and received from the client device in response to the preemptive acknowledgements at least until the intermediate network device determines the network file protocol write command messages were successfully received by the file server; and sending a file transfer error indication message to the client device from the intermediate network device upon determining at least one failed receipt of one or more of the network file protocol write command messages by the file server.

2. The method of claim 1, further comprising selectively forwarding the flush data command messages to the file server upon determining the file server successfully received the forwarded network file protocol write command messages.

3. The method of claim 1, wherein sending the file transfer error indication message to the client device further comprises at least one of:
closing a TCP/IP connection between the client device in the first network and the file server in the second network; or
sending a failed flush data command result message to the client device.

4. The method of claim 1, wherein the flush data command messages instruct the file server to store buffered file portions from the network file protocol write command messages in a file location accessible to the file server.

5. A computer-readable readable medium having stored thereon computer-executable instructions to be executed by an intermediate network device for handling network file transfer errors, which when executed, causes the intermediate network device to perform steps comprising:
forwarding one or more network file protocol write command messages received from a client device in a first network to a file server in a second network in connection with a file transfer operation;
sending one or more preemptive acknowledgements to the client device in response to each of the received network file protocol write command messages;
withholding forwarding one or more flush data command messages destined for the file server and received from the client device in response to the preemptive acknowledgements at least until determining the network file protocol write command messages were successfully received by the file server; and
sending a file transfer error indication message to the client device upon determining at least one failed receipt of one or more of the network file protocol write command messages by the file server.

6. The computer-readable medium of claim 5, further having stored thereon computer-executable instructions which when executed cause the intermediate network device to perform steps further comprising selectively forwarding the flush data command messages to the file server upon determining the file server successfully received the forwarded network file protocol write command messages.

7. The computer-readable medium of claim 5, wherein sending the file transfer error indication message to the client device further comprises at least one of:
closing a TCP/IP connection between the client device in the first network and the file server in the second network; or
sending a failed flush data command result message to the client device.

8. The computer-readable medium of claim 5, wherein the flush data command messages instruct the file server to store buffered file portions from the network file protocol write command messages in a file location accessible to the file server.

9. An intermediate network device comprising:
a memory storing programming instructions; and
a processor configured to be capable of executing the stored programming instructions to perform steps comprising:
forwarding one or more network file protocol write command messages received from a client device in a first network to a file server in a second network in connection with a file transfer operation,
sending one or more preemptive acknowledgements to the client device in response to each of the received network file protocol write command messages;
withholding forwarding one or more flush data command messages destined for the file server and received from the client device in response to the preemptive acknowledgements at least until determining the network file protocol write command messages were successfully received by the file server; and
sending a file transfer error indication message to the client device upon determining at least one failed receipt of one or more of the network file protocol write command messages by the file server.

10. The intermediate network device of claim 9, wherein the processor is further configured to be capable of executing the stored programming instructions to perform steps further comprising selectively forwarding the flush data command messages to the file server upon determining the file server successfully received the forwarded network file protocol write command messages.

11. The intermediate network device of claim 9, wherein sending the file transfer error indication message to the client device further comprises at least one of:
closing a TCP/IP connection between the client device in the first network and the file server in the second network; or
sending a failed flush data command result message to the client device.

12. The intermediate network device of claim 9, wherein the flush data command messages instruct the file server to store buffered file portions from the network file protocol write command messages in a file location accessible to the file server.

13. A method comprising:
forwarding one or more network file protocol write command messages received from a client device in a first network to a file server in a second network from an intermediate network device in the first network in connection with a file transfer operation;
sending one or more corresponding preemptive acknowledge messages from the intermediate network device to the client device, the one or more corresponding preemptive acknowledge messages associated with the one or more network file protocol write command messages forwarded to the file server;
receiving one or more flush data command messages from the client device at the intermediate network device, the one or more flush data command messages received in response to the one or more preemptive acknowledgement messages;
determining at the intermediate network device whether all the forwarded network file protocol write command messages were successfully received at the file server, wherein the intermediate network device does not forward the one or more flush data command messages received from the client device until receiving a write command acknowledgement from the file server; and
forwarding the one or more flush data command messages from the intermediate network device to the file server upon receiving the write command acknowledgement for all of the one or more forwarded network file protocol write command messages from the file server.

14. The method of claim 13, further comprising sending a file transfer error indication message to the client device upon determining that all the forwarded network file protocol write command messages were not successfully received at the file server and at least one of:
: closing a TCP/IP connection between the client device in the first network and the file server in the second network; or
: sending a failed flush data command result message to the client device.

15. The method of claim 13, wherein the flush data command messages instruct the file server to store buffered file portions from the network file protocol write command messages in a file location accessible to the file server.

16. The method of claim 13, wherein a first TCP/IP connection is established between the client device and the intermediate network device over the first network and a second TCP/IP connection is established between the intermediate network device and the file server over the second network.

17. A non-transitory computer-readable medium having stored thereon computer-executable instructions to be executed by an intermediate network device for handling network file transfer errors, which when executed, causes the intermediate network device to perform steps comprising:
: forwarding one or more network file protocol write command messages received from a client device in a first network to a file server in a second network in connection with a file transfer operation;
: sending one or more corresponding preemptive acknowledge messages to the client device, the one or more corresponding preemptive acknowledge messages associated with the one or more network file protocol write command messages forwarded to the file server;
: receiving one or more flush data command messages from the client device, the one or more flush data command messages received in response to the one or more preemptive acknowledgement messages;
: determining whether all the forwarded network file protocol write command messages were successfully received at the file server and not forwarding the one or more flush data command messages received from the client device until receiving a write command acknowledgement from the file server; and
: forwarding the one or more flush data command messages to the file server upon receiving the write command acknowledgement for all of the one or more forwarded network file protocol write command messages from the file server.

18. The medium of claim 17, further having stored thereon computer-executable instructions which when executed cause the intermediate network device to perform steps further comprising sending a file transfer error indication message to the client device upon determining that all the forwarded network file protocol write command messages were not successfully received at the file server and at least one of:
: closing a TCP/IP connection between the client device in the first network and the file server in the second network; or
: sending a failed flush data command result message to the client device.

19. The medium of claim 17, wherein the flush data command messages instruct the file server to store buffered file portions from the network file protocol write command messages in a file location accessible to the file server.

20. The medium of claim 17, wherein a first TCP/IP connection is established between the client device and the intermediate network device over the first network and a second TCP/IP connection is established between the intermediate network device and the file server over the second network.

21. An intermediate network device comprising:
: a memory configured to store processor executable programming instructions; and
: a processor configured to be capable of executing the stored programming instructions to perform steps comprising:
:: forwarding one or more network file protocol write command messages received from a client device in a first network to a file server in a second network in connection with a file transfer operation;
:: sending one or more corresponding preemptive acknowledge messages to the client device, the one or more corresponding preemptive acknowledge messages associated with the one or more network file protocol write command messages forwarded to the file server;
:: receiving one or more flush data command messages from the client device, the one or more flush data command messages received in response to the one or more preemptive acknowledgement messages;
:: determining whether all the forwarded network file protocol write command messages were successfully received at the file server and not forwarding the one or more flush data command messages received from the client device until receiving a write command acknowledgement from the file server; and
:: forwarding the one or more flush data command messages to the file server upon receiving the write command acknowledgement for all of the one or more forwarded network file protocol write command messages from the file server.

22. The intermediate network device of claim 21, wherein the processor is further configured to be capable of executing the stored programming instructions to perform steps further comprising sending a file transfer error indication message to the client device upon determining that all the forwarded network file protocol write command messages were not successfully received at the file server and at least one of
: closing a TCP/IP connection between the client device in the first network and the file server in the second network; or
: sending a failed flush data command result message to the client device.

23. The intermediate network device of claim 21, wherein the flush data command messages instruct the file server to store buffered file portions from the network file protocol write command messages in a file location accessible to the file server.

24. The intermediate network device of claim 21, wherein a first TCP/IP connection is established between the client device and the intermediate network device over the first network and a second TCP/IP connection is established between the intermediate network device and the file server over the second network.

* * * * *